July 3, 1928.
R. CHETTEVILLE
CAMERA FOCUSING ATTACHMENT
Filed April 15, 1927
1,675,598
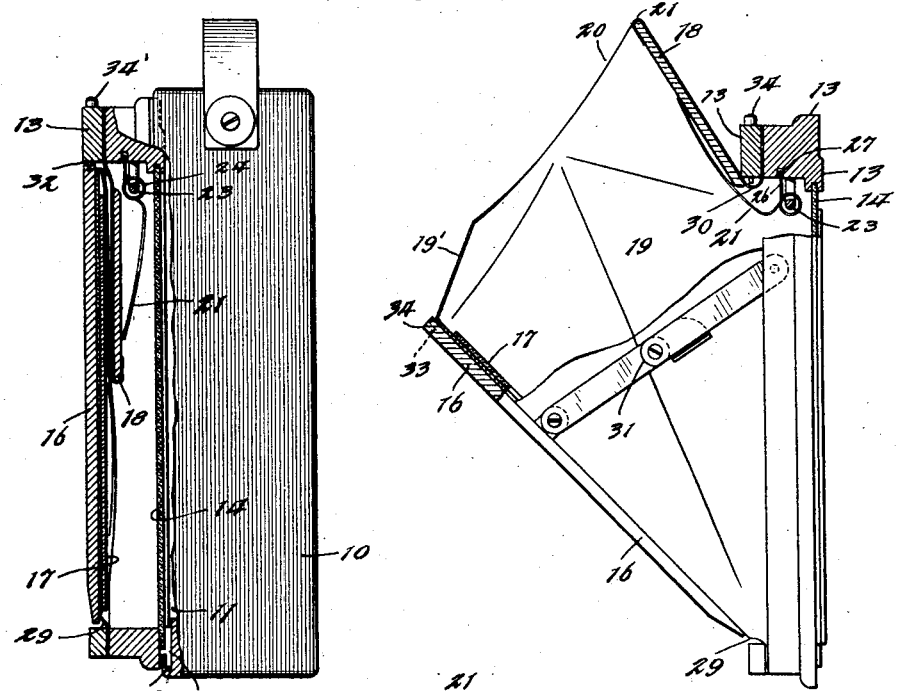
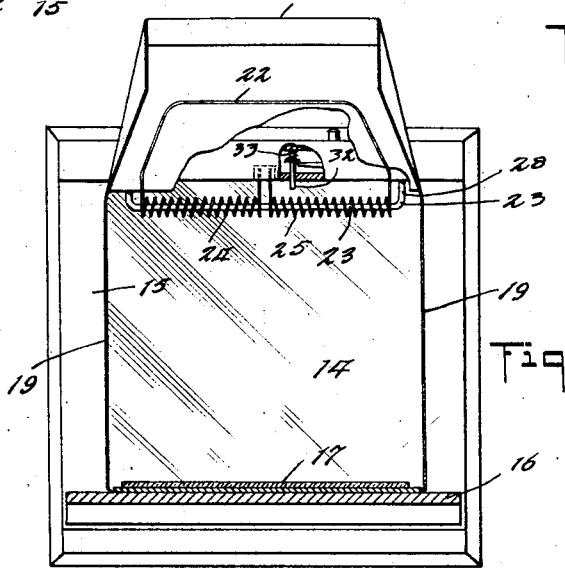
INVENTOR.
RUDOLPH CHETTEVILLE
BY Warren S. Orton.
ATTORNEY Patented July 3, 1928.

1,675,598

UNITED STATES PATENT OFFICE.

RUDOLPH CHETTEVILLE, OF NEW YORK, N. Y.

CAMERA FOCUSING ATTACHMENT.

Application filed April 15, 1927. Serial No. 184,170.

The invention relates in general to a focusing attachment for a camera of the type of such devices which include a ground glass for receiving the inverted image, a reflector for reverting the position of the image and a collapsible hood provided with a sight opening for inspecting the image in the reflector while shutting off outside light.

The primary object of the invention is to provide a simplified form of attachment of the type outlined which will be formed of a minimum number of structural parts, in which the sight opening containing part of the collapsible hood will be held stretched under tension, in which the collapsible parts are designed to be contained within the attachment when closed and in which the collapsible hood is automatically distended into operative position under spring tension when the parts are released from their locked, collapsed position.

Another object of the invention is to provide an attachment of the type outlined which can be adjustably positioned on the camera casing so that the sight opening will be extended upwardly or in any other desired direction when the camera is in its normal upright position or when any of its other sides are positioned face upward.

Various other objects and advantages of the invention will be in part obvious from an inspection of the accompanying drawings and in part will be more fully set forth in the following particular description of one form of mechanism embodying my invention, and the invention also consists in certain new and novel features of construction and combination of parts hereinafter set forth and claimed.

In the accompanying drawing:

Fig. 1 is a view in side elevation of a camera equipped with a preferred embodiment of the invention shown in closed position and with parts broken away to show internal construction;

Fig. 2 is a view in side elevation of the attachment shown in Fig. 1 with the hood in distended position and with parts broken away to show internal construction; and Fig. 3 is a view in rear elevation of the structure shown in Fig. 2 and with parts broken away to show internal construction.

In the drawing and referring particularly to Fig. 1 there is illustrated a conventional form of camera casing 10 except that the rear open end 11 is provided at top and bottom with a pair of inwardly facing grooves 12 opened at opposite ends and adapted to receive the attachment 12 particularly constituting the novel element of this invention and permitting the mounting thereof in a plurality of positions.

The attachment 12 comprises a main supporting frame 13 in which is fitted a ground glass 14 and for this reason this frame will be referred to hereinafter as the ground glass frame. The side of the ground glass frame which is designed to fit against the open end 11 of the casing 10 is square in elevation and is provided on its four sides with outwardly extending tongues 15. Either pair of opposing tongues are designed to have a sliding fit in the groove 12 and in this way the attachment as a whole may be mounted in the camera casing in either of two positions, one at right angles to the other.

The attachment includes an outwardly and downwardly swinging frame 16 mounted on the inner face of which is a mirror 17 and for this reason the frame 16 will be referred to hereinafter as a reflector frame. Loosely hung to depend from the upper part of the ground glass frame is a flat, rigid, stiffening member 18 which due to the fact that it forms a collapsible part of the hood hereinafter more fully described, will be referred to hereinafter as a hood frame 18. Extending between the ground glass frame and the reflector frame and also extending between the hood frame and the reflector frame are collapsible sides 19 which coact with the frames to form a hood designed to be folded within the outlines of the frames 13 and 16 when in the collapsed position shown in Fig. 1. The collapsible hood also includes a top part 19' designed to coact with the hood frame 18 to extend above the rearwardly horizontally projected outline of the camera when in the distended position shown in Fig. 2. The top part 19' of the hood is provided with a sight opening 20, one side of which is outlined by the free edge 21 of the hood frame. The sight opening is proportioned so as to permit the user to see the image in the mirror 17; and at the same time in order to minimize the possibility of light leakage into the hood the sight opening is made of the least possible area to accommodate the eyes of the user.

The hood frame is elevated from the collapsed position shown in Fig. 1 into the distended position shown in Fig. 2 and the reflector frame is kicked into its open position shown in Fig. 2 and the hood distended upwardly by means of a spring 21 bearing on the inner or under side of the hood frame 18. The spring 21 is an endless wire as particularly shown in Fig. 3, the middle portion of which is bent into a U-shaped bearing member 22 and the end portions of which are coiled in opposite directions about a spring guide rod 23 to form oppositely disposed coiled spring sections 24 and 25. The ends 26 of the spring are brought towards each other and are received in a centrally positioned slot 27 formed on the inner face of the top side of the frame 13. The guide rod 23 has its opposite ends 28 bent laterally and secured in the frame 13.

Preferably the collapsible sides 19 are formed of one piece of black fabric of the type usually used in such constructions and preferably constitutes the hinge connection 29 between the reflector frame and the ground glass frame 13 and also constitutes the hinge connection 30 between the hood frame 18 and the ground glass frame 13.

The reflector frame is locked in its distended position as shown in Fig. 2 by means of a knuckle hinge joint 31 as is usual in such constructions. The reflector frame 16 is locked in its collapsed position shown in Fig. 1 by means of a spring pressed latch 32 carried by the frame 13 and extending into a recess 33 at the top edge 34 of the frame 16. The latch 32 is released and moved into unlocked position against the tension of the spring 33 by means of a single finger actuated lever 34 projecting above the frame 13.

In operation and assuming that the parts are in the collapsed position shown in Fig. 1, the operator by pressing on the lever 34 releases the reflector frame. At this time the spring 21 as shown in Fig. 1 is under tension and bears forcefully against the adjacent side of the hood frame 18 which in turn bears against the reflector frame 16 and acts to project the same downwardly and outwardly into the position shown in Fig. 2. As the reflector frame 16 moves out of the path of the upwardly swinging hood frame 18 this hood frame is free to swing from the depending position in Fig. 1 into the upwardly extending position shown in Figs. 2 and 3. The movement of the frames 16 and 18 in opposite directions distends the collapsible sides and elevates the sight opening into position to be conveniently available to the operator. The tension of the spring will be usually sufficient to move the locking means 31 into the elongated, operative position shown in Fig. 2 but in case this locking means does not so move into fixed position the operator can easily lift the jointed part into the fully locked position shown in Fig. 2. The construction can then be used to focus the images as is usual in the operation of such devices.

When it is desired to collapse the structure from the position shown in Fig. 2 into the position shown in Fig. 1 the locking means 31 is manually released by breaking the joint and pressing down upon the upwardly exposed side of the hood frame. It can be moved from the position shown in Fig. 2 towards the position shown in Fig. 1 and until the free edge 21 has been swung past a position extending at right angles to the frame 16. Manual pressure on the frame 18 can then be released and frame 16 elevated into its fully closed position while elevating the latch 32. Releasing pressure on the lever 34 permits the latch to move into locking position and the construction is restored to the closed condition shown in Fig. 1.

Should it be desired to turn the camera on either side or to reset the sight opening to extend from any desired side of the camera, the attachment may be withdrawn by engaging the frame 13, turning the same 90 degrees and resetting it into engagement with the grooves on the camera casing. In this way the sight opening may be positioned to extend in any direction irrespective as to what side of the camera may be facing upwardly.

By means of the device disclosed it is possible to provide a collapsible, focusing hood which will automatically spring open into an operative position simply by releasing the latch which holds the reflector frame in its normally closed position. The portion of the hood which contains the sight opening is held rigidly in position to prevent accidental contraction of the sight opening and at the same time there has been avoided the necessity of providing a separate sight opening containing part distinct from the foldable part of the hood as characterizes known structures. The reflector frame as well as the part of the hood containing the sight opening is projected into operative position by the use of a single spring which when the device is closed bears on the parts at points remote from their pivotal connections thus minimizing strains on the pivotal connections but permitting the spring to exert its maximum distending effect when the holding latch is released.

Having thus described my invention, I claim:

1. A camera attachment comprising a ground glass frame, a reflector frame, means hingedly connecting the bottom edges of said frames, a hood frame hingedly connected to the upper edge of the ground glass frame, collapsible sides connecting the adjacent edges of the reflector frame and the hood frame and coacting therewith to form a collapsible hood having a sight opening and said hood frame mounted for swinging movement from a position extending upwardly from the ground glass frame when the hood is distended into a depending position contained within the hood when the hood is collapsed, a spring between the ground glass frame and the hood frame and tending to swing the hood frame from its depending into its upstanding position and thus tending to distend the hood and releasable means for securing the reflector frame to the ground glass frame and thus secure the hood in collapsed position against the opening tension of said spring.

2. A camera attachment comprising a ground glass frame, a reflector frame, means hingedly connecting the bottom edges of said frames, a hood frame hingedly connected to the upper edge of the ground glass frame, collapsible sides connecting the adjacent edges of the reflector frame and the hood frame and coacting therewith to form a collapsible hood having a sight opening and said hood frame mounted for swinging movement from a position extending upwardly from the ground glass frame when the hood is distended into a depending position contained within the hood when the hood is collapsed and a spring between the ground glass frame and the hood frame and tending to swing the hood frame from its depending into its upstanding position and thus tending to distend the hood.

3. In a camera, the combination of a ground glass frame, a reflector frame and a hood frame both hingedly connected thereto, collapsible sides between the free frames and coacting therewith to provide a collapsible hood, spring controlled means for moving the hood frame and with it the entire hood into a distended position and means between the reflector and ground glass frames for locking the hood in distended position.

4. In a camera, the combination of a ground glass frame, a reflector frame and a hood frame both hingedly connected thereto, collapsible sides between the three frames and coacting therewith to provide a collapsible hood and spring controlled means for moving the hood frame and with it the entire hood into a distended position.

5. In a camera, the combination of a ground glass frame, a reflector frame, collapsible sides connecting the frames and coacting therewith to provide a hood, a spring guide rod carried by the ground glass frame and a spring coiled on said rod bearing on the reflector frame and tending when free of restraint to move the hood into distended position.

6. In a camera, the combination of a ground glass frame, a reflector frame, collapsible sides connecting the frames and coacting therewith to provide a hood, a spring guide rod carried by the ground glass frame, a spring coiled on said rod, bearing on the reflector frame and tending when free of restraint to move the hood into distended position and a catch between the frame for securing the hood in closed position with said spring under tension.

Signed at New York in the county of New York and State of New York this 14th day of April A. D. 1927.

RUDOLPH CHETTEVILLE.